March 4, 1924.　　　　　　　　　　　　　　　　1,485,503
T. A. HENDRICKS
ROAD LIGHT FOR AUTOMOBILES
Filed March 6, 1923　　　2 Sheets-Sheet 1
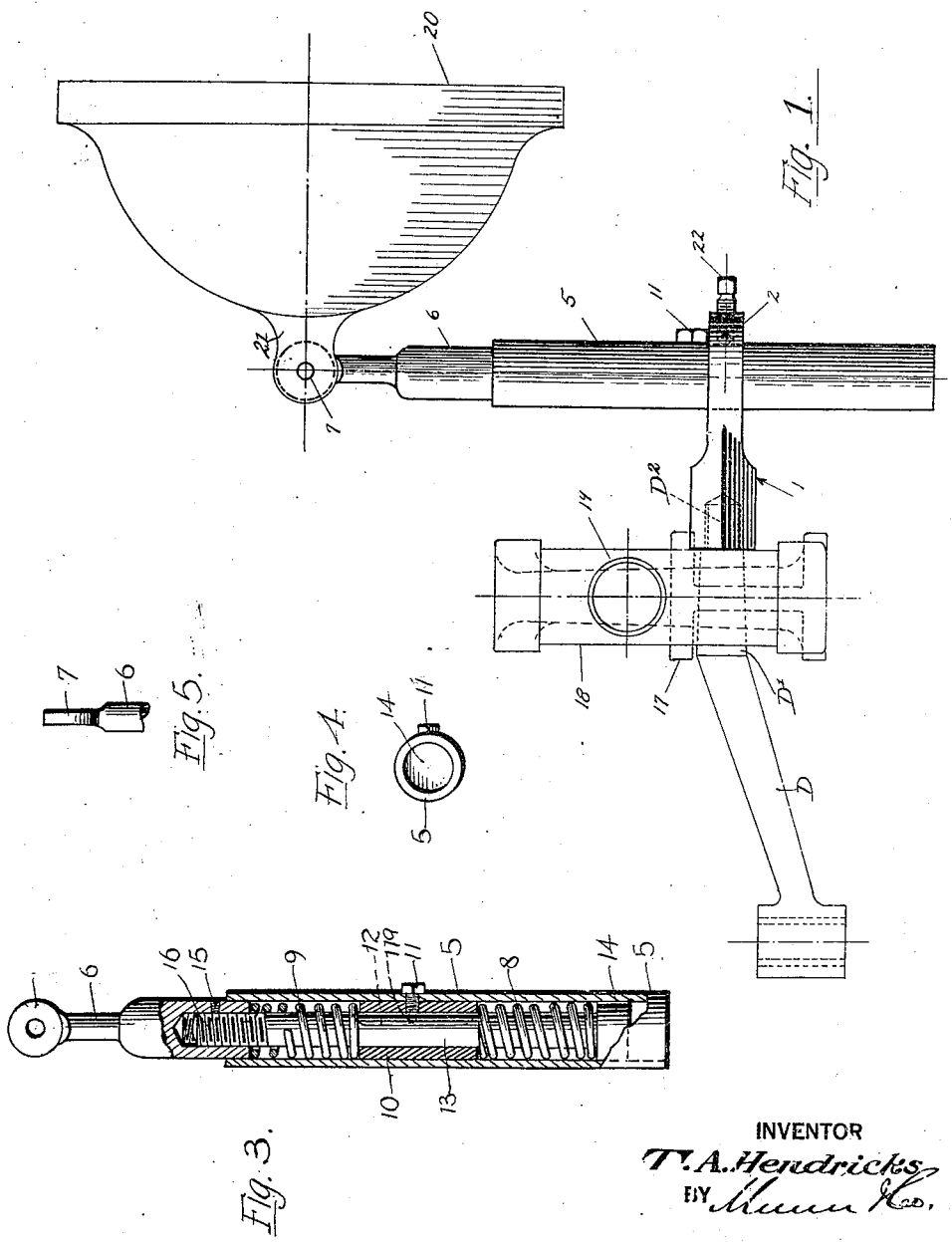
INVENTOR
T. A. Hendricks
BY
ATTORNEY March 4, 1924.
T. A. HENDRICKS
1,485,503
ROAD LIGHT FOR AUTOMOBILES
Filed March 6, 1923   2 Sheets-Sheet 2
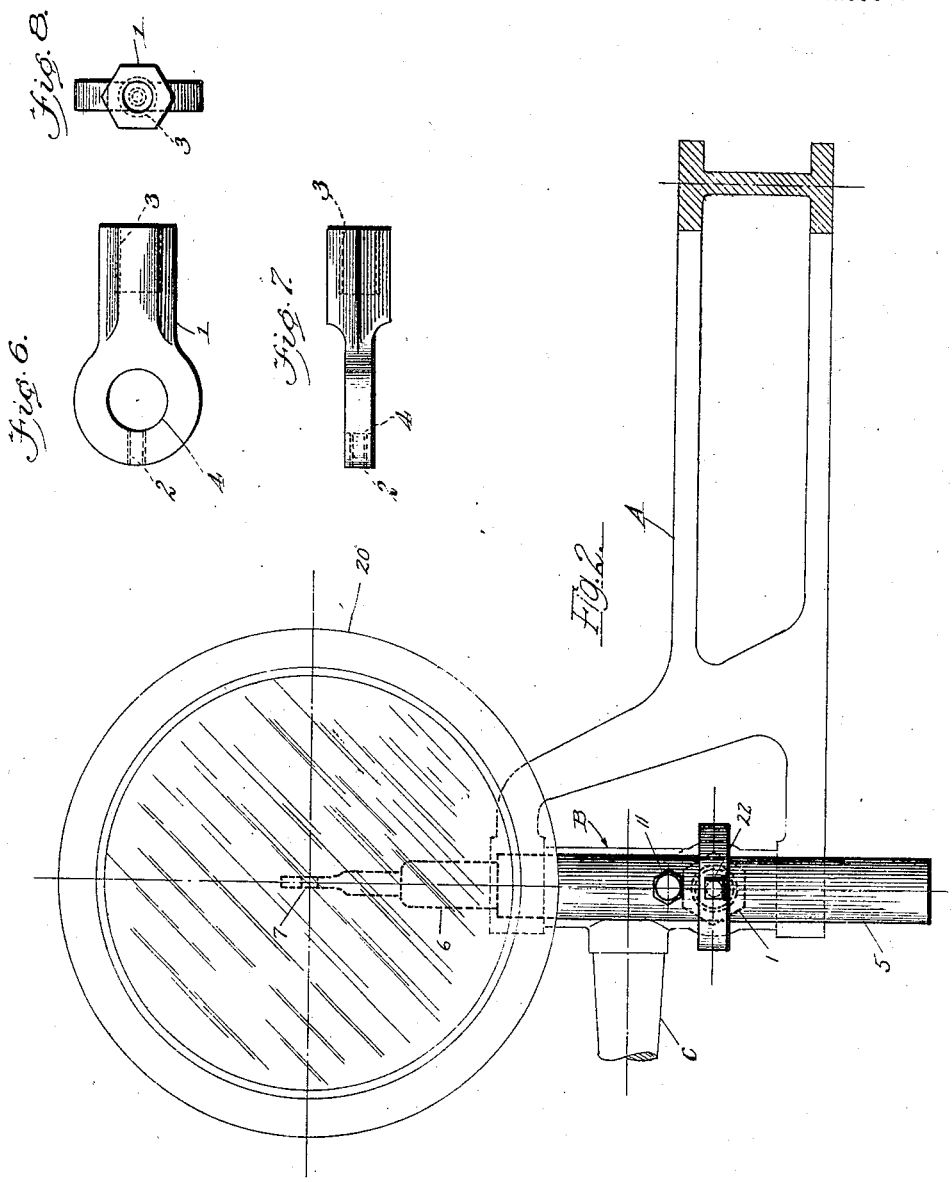
INVENTOR
T. A. Hendricks
BY
ATTORNEY Patented Mar. 4, 1924.

1,485,503

UNITED STATES PATENT OFFICE.

THOMAS A. HENDRICKS, OF LEXINGTON, KENTUCKY.

ROAD LIGHT FOR AUTOMOBILES.

Application filed March 6, 1923. Serial No. 623,271.

*To all whom it may concern:*

Be it known that I, THOMAS A. HENDRICKS, a citizen of the United States, and a resident of Lexington, in the county of Fayette and State of Kentucky, have invented certain new and useful Improvements in Road Lights for Automobiles, of which the following is a specification.

My present invention relates generally to road lighting devices for automobiles, and more particularly to a simple effective lamp and lamp bracket capable of being mounted in such a way as to flood the roadway surface forwardly of the right front wheel of an automobile or motor car, my object being to do this without endangering glare to vehicles as well as pedestrians proceeding in an opposite direction and in such manner that the light will follow angular movements of the adjacent wheel and will at the same time be protected against jars and jolts in operation.

My invention thus resides not only in the particular application of a roadway light, but also in the particular manner in which this light is mounted whereby jolts and jars may be absorbed in operation.

In the accompanying drawings which illustrate my invention and form a part of this specification, Figure 1 is a side view showing the practical application of my invention, Figure 2 is a front view of the parts shown in Figure 1, Figure 3 is a longitudinal section through the barrel and stem, Figure 4 is an end view looking at the lower end of the barrel and stem of Figure 3, Figure 5 is a fragmentary side view of the upper portion of the stem of Figure 3, and Figures 6, 7 and 8 are respectively a top plan, side view and end view of the bracket.

Referring now to these figures I have shown in Figures 1 and 2 certain parts of an automobile including the front axle A between portions of which the spindle bolt housing B rotates on a vertical axis to swing the right front wheel spindle C under control of the steering connections including the steering arm D. The forward end of this steering arm D is as usual connected through a bearing forming a part of the spindle bolt housing B, the said forward end of the arm D being on a taper D' for this purpose and having a reduced threaded forward extension $D^2$ which usually receives a nut to maintain the connection.

According to my present invention this nut is removed and a lamp holding bracket 1 is substituted, having at its forward end a set screw receiving aperture in which a set screw 22 is threaded at one side of a vertical opening 4, the opposite or rear end of the bracket having a threaded axial bore by means of which it is adapted to screw onto the threaded extension $D^2$ and not only serve to rigidly hold the bracket in place but also serve the function of the usual nut.

Through the opening 4 at the outer or forward end of the bracket 1 a vertical tubular barrel 5 is adjustably held by virtue of the set screw 22, this barrel supporting a lamp holding stem including an upper part 6 having an apertured head 7, and a lower part 13 having a lower head 14 and an upper threaded end 16 the latter of which moves into a bore at the lower end of the upper part 6 and is secured in adjustable relation therewith by a set screw 15.

Within the barrel 5 and intermediate the ends thereof a sleeve 10 securely held by a set screw 11, is disposed, the latter part 13 of the stem passing through this sleeve in order to provide for the reception of coil springs 8 and 9 around the lower part of the stem, bearing at their inner ends against the ends of the sleeve 10 and at their outer ends against the lower end of the upper part 6 and the upper surface of the head 14. These springs are compressed in place so that they will operate in use to absorb shocks and in this way more effectively hold the lamp 20 having a rear extension or ear 21 rigidly connected to the upper apertured head 7 of the stem.

It will be noted that the lower portion 13 of the stem has an elongated slot 12 intermediate its ends, with which the inner reduced end $11^a$ of the set screw 11 extends, so as to permit lengthwise or vertical movements of the lamp holding stem and at the same time prevent its rotation with respect to the barrel 5.

It is obvious from the foregoing that the installation of my improved roadway light and supporting means becomes an easy simple matter involving as it does the removal of the usual nut holding the steering arm D, the screwing of the bracket 1 in place in lieu of this nut, and the disposition of the barrel 5 downwardly through the apertured end 4 of the bracket and the locking thereof in place by the tightening of the set screw 22.

It is likewise obvious that being disposed as it is close to the right front wheel and following the movements thereof, the lamp will be sufficiently concealed from view to avoid all glare and that the roadway surface will be flooded with light in front of the right front wheel and sufficiently far to the right hand side thereof to give the operator full view of the roadside which is especially desirous where as in so many instances a ditch and the like borders the roadway.

I claim:

1. A roadway lamp for automobiles and a support therefor including a bracket having means to engage a portion of the steering arm of an automobile, a barrel clamped vertically in the bracket, a member to which the lamp is attached movable vertically within the barrel and having a sleeve thereon intermediate its ends and springs compressed between opposite sides of the sleeve and spaced portions of the said member, and a set screw threaded through the wall of the barrel and engaging said sleeve to detachably secure the latter within the barrel.

2. A roadway lamp for automobiles and a support therefor including a bracket having means to engage a portion of the steering arm of an automobile, a barrel clamped vertically in the bracket, a member to which the lamp is attached movable vertically within the barrel and having a sleeve thereon intermediate its ends and springs compressed between opposite sides of the sleeve and spaced portions of the said member, and a set screw threaded through the wall of the barrel and engaging said sleeve to detachably secure the latter within the barrel, said vertically shiftable member within the barrel having a lengthwise groove and said set screw having an extension projecting into the groove whereby to prevent rotation of the member during its vertical movement.

3. In a device of the character described, a lamp, a supporting stem to which the lamp is connected, a barrel through which said stem is shiftable in the direction of its length, a sleeve loose on the stem and fixed within the barrel intermediate the ends of the latter, springs within the barrel and around the stem, compressed between portions of the latter and the said sleeve, and a bracket through one end of which said barrel is detachably mounted, having an axial threaded bore at its opposite end.

THOMAS A. HENDRICKS.